April 12, 1938.                A. D. KIRKLAND                 2,114,110
                    GRINDING AND MIXING APPARATUS AND METHOD
                         Filed Dec. 18, 1931         4 Sheets-Sheet 4
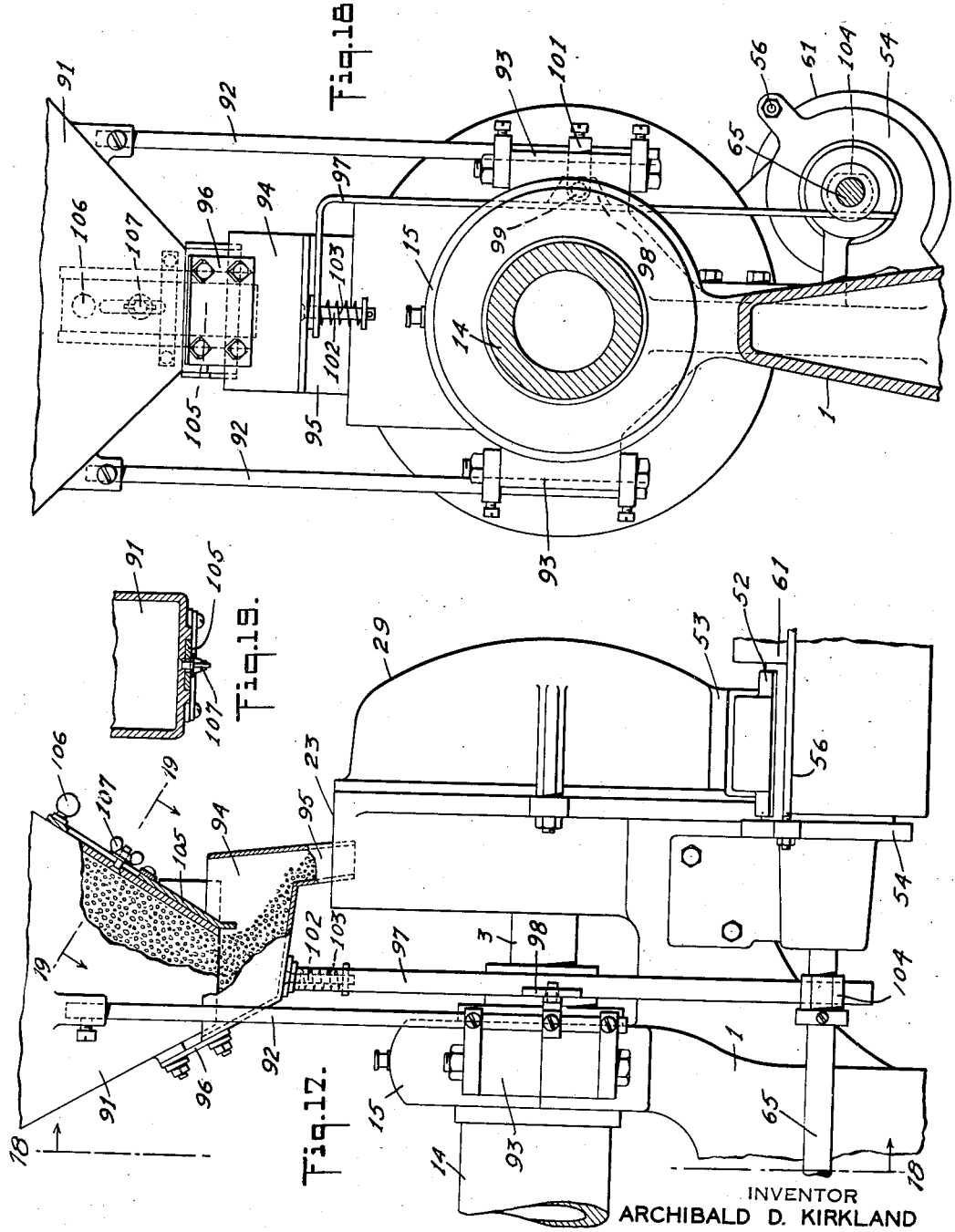
INVENTOR
ARCHIBALD D. KIRKLAND
BY
ATTORNEY Patented Apr. 12, 1938

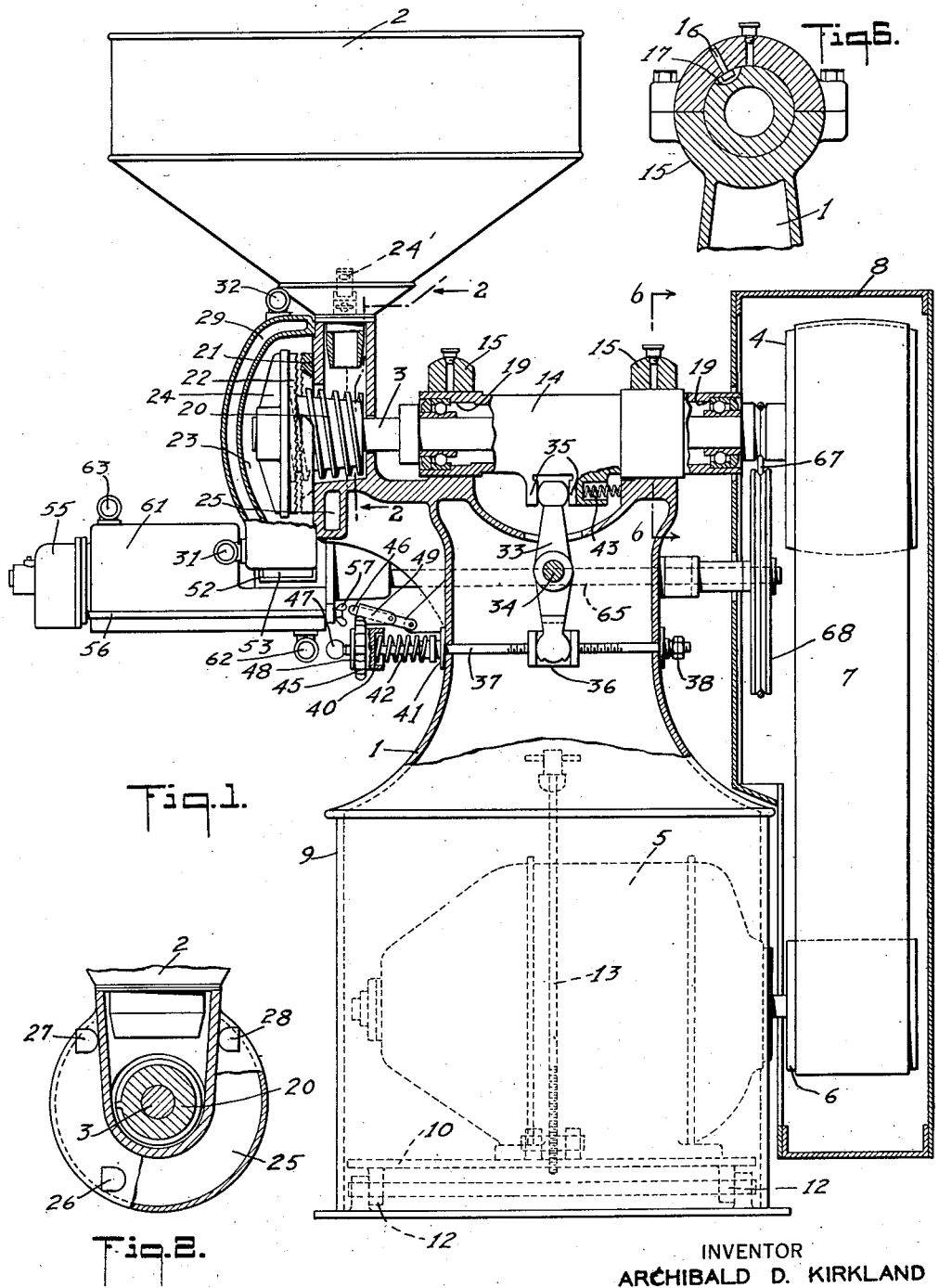

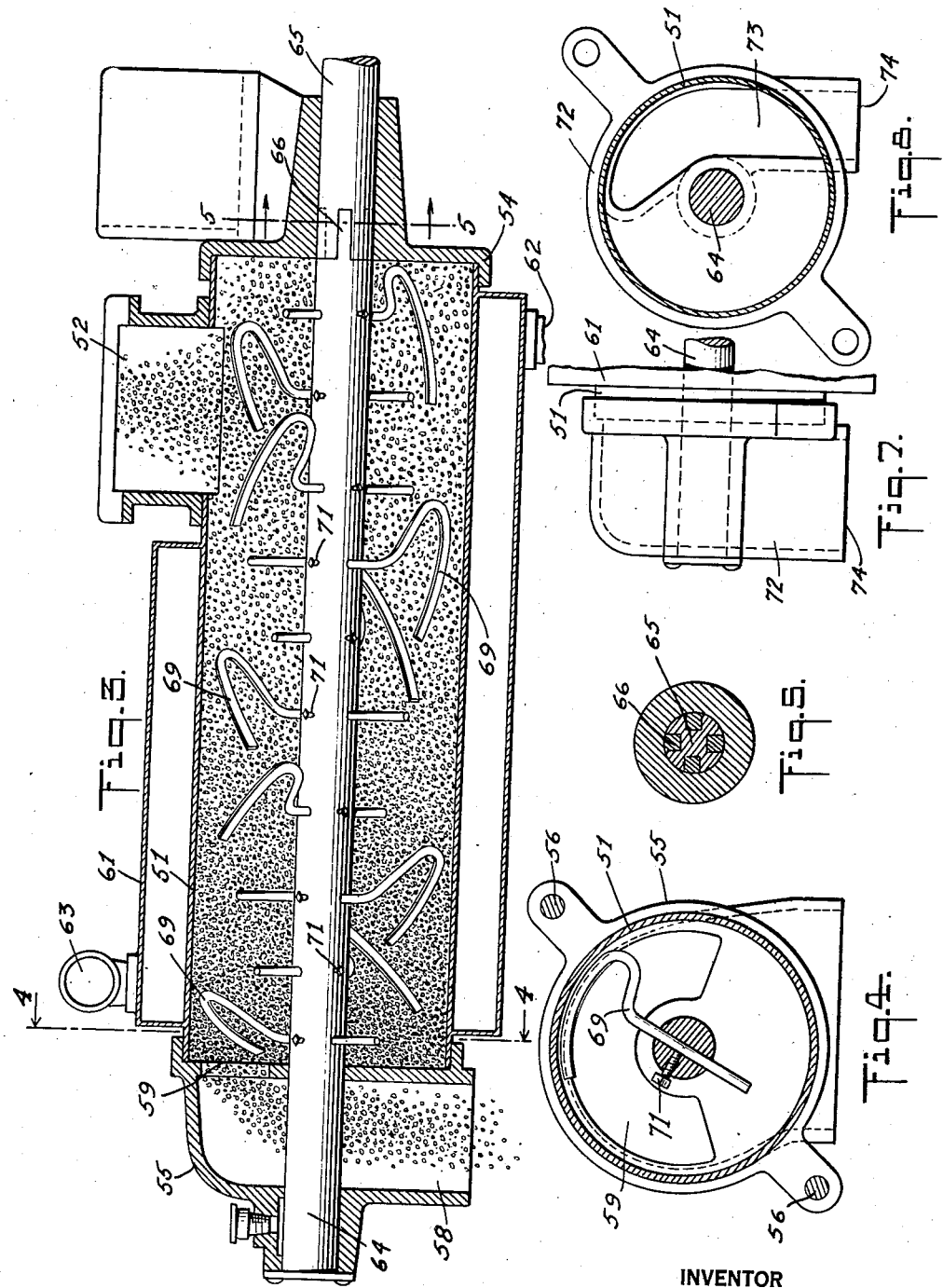
April 12, 1938.  A. D. KIRKLAND  2,114,110
GRINDING AND MIXING APPARATUS AND METHOD
Filed Dec. 18, 1931  4 Sheets-Sheet 2
INVENTOR
ARCHIBALD D. KIRKLAND
BY
ATTORNEY

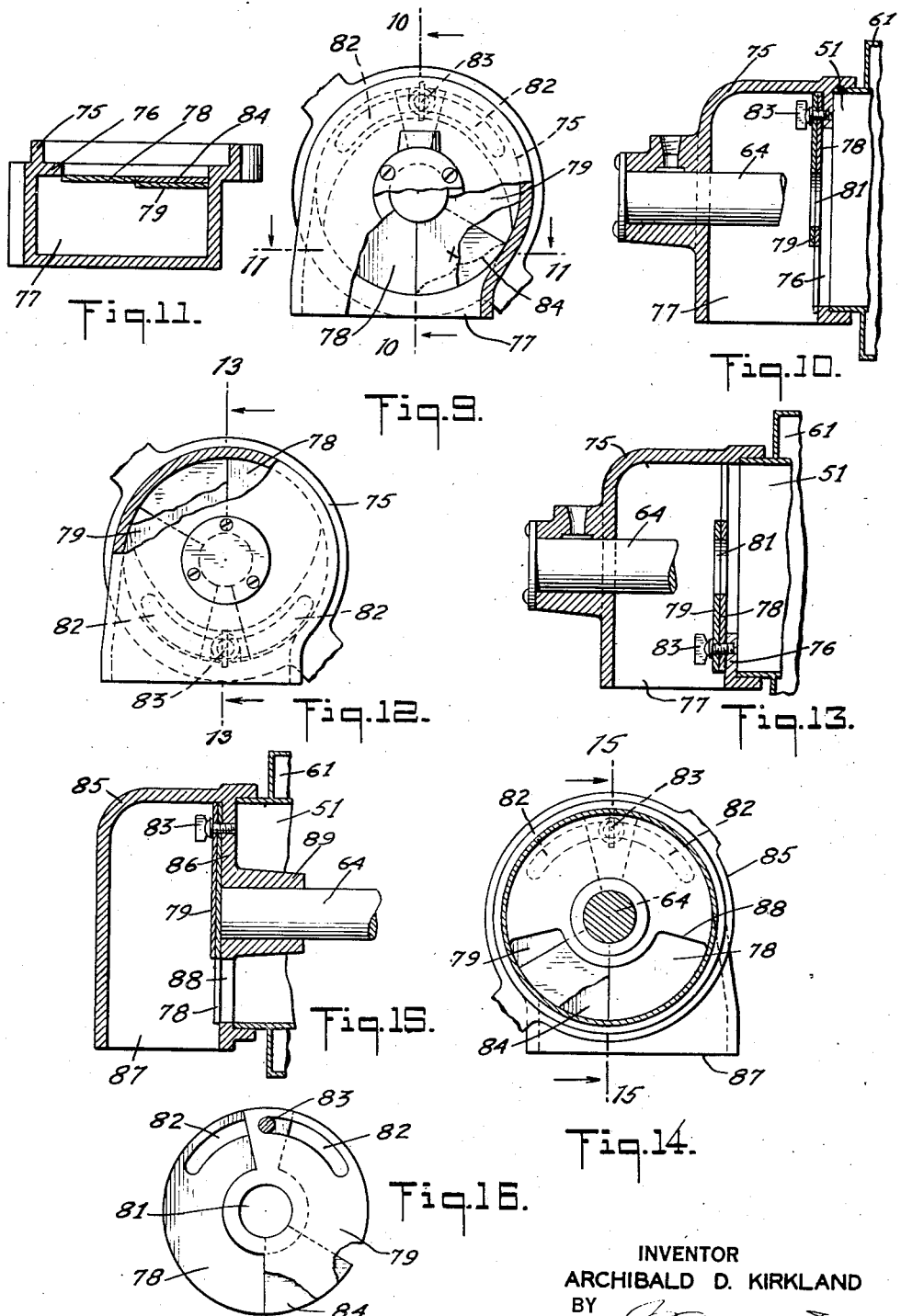

2,114,110

UNITED STATES PATENT OFFICE 2,114,110

GRINDING AND MIXING APPARATUS AND METHOD

Archibald D. Kirkland, New York, N. Y., assignor to Jabez Burns & Sons, Inc., New York, N. Y., a corporation of New York Application December 18, 1931, Serial No. 581,912

11 Claims. (Cl. 83—18)

This invention relates to apparatus for grinding and mixing dry materials such as coffee and chaff and has for its object to produce a homogeneous, non-stratifying mixture derived from various sized particles of material ranging all the way from dust to large flakes and granules.

Another object of the invention is to provide a simple, compact device for thoroughly mixing dry comminuted materials without tossing or aeration and for extruding the mixed materials under controlled conditions to prevent subsequent separation of the light and heavy particles.

Another object of the invention is to provide a combined grinding and mixing mill for continuously grinding coffee and other dry materials, thoroughly mixing and compacting the ground particles and comminuting or pulverizing the chaff to render the chaff practically invisible in the final product, and delivering the mixture to packages or containers in a homogeneous state, all in a single handling.

Another object of the invention is to provide a combined grinding and mixing mill with coordinated feeding, grinding and mixing mechanisms and with means for cooling the material from the time it enters the mill until discharged in the final mixed state.

In grinding coffee beans in retail grocery or coffee stores, the grinding medium usually consists of a pair of cast iron or steel disks of such construction as will best cut or granulate the coffee and chaff, and the product consists of a mixture of various sized particles ranging all the way from dust to the largest granules or flakes that the adjustment of the plates will allow to pass through.

These retail mills are usually provided with a large receptacle under the discharge spout. When the product is discharged from the mill spout into the receptacle, a decided separation takes place and a large amount of chaff and dust adheres to the inner sides and upper portion of the receptacle while the heavier coffee granules descend into the lower portion of the receptacle. When a given quantity of coffee has passed through the mill and is then emptied from the receptacle into the usual paper bag, tin can or cardboard container, the material adhering to the receptacle has to be knocked off and usually falls down on top of the heavier product already in the container. This separation between the light and heavy particles is unsightly, causes suspicion in the mind of the retail buyer, and of course the mixture is no longer uniform.

Wholesale coffee manufacturers and roasters get a more homogeneous mixture by running the ground coffee and chaff through continuous mixers, or batch mixers, as the case may be, to get a thorough mixing and incorporation of the chaff with the coffee before putting the product up in packages. Such a mixing machine usually consists of a large drum having an inlet opening at one end and a discharge opening at the other end, and containing a plurality of rotatable spiral flanges. In mixing machines of this type the space or volume capacity in the mixing chamber is large as compared to the volume of material being mixed. The result is that while the material is being agitated it is constantly tossed in the air without reducing or comminuting the chaff and, when the gate is opened and the material passed from the mixer into any kind of receptacle, the lighter material owing to air friction drops more slowly than the heavier material and a continuous separation results. Consequently, even when the chaff is thoroughly incorporated with the coffee in the mixing drum, a separation of the light and heavy particles takes place when the goods are dropped through the air into the receptacle so that the product is not uniform when it reaches the consumer.

The present invention provides an improved mixer which may be used as a separate unit or in direct association with any suitable grinding mill from the smallest mill used in retail grocery and coffee stores to the larger mills used in wholesale roasting plants, and overcomes all the disadvantages referred to above.

In the preferred form of the invention the dry material, such as ground coffee and chaff, is delivered to a drum or chamber which is small in diameter in proportion to its length and is provided with rotatable mixing and conveying devices of any suitable type. The mixing chamber is long enough to thoroughly incorporate the chaff with the coffee, and small enough in diameter so that the material substantially fills the chamber. This tendency to fill the chamber is further increased by a restricted discharge opening which is provided at the end remote from the inlet, and which tends to slightly back up the product and accumulate a mass of material which when agitated by the mixing and conveying devices will reduce or comminute and conceal the chaff. When the mixer is directly associated with a grinding mill, as hereinafter described, the air produced by the mill plates tends to further slightly pack the material in the mixing chamber.

The mixing, agitating and conveying of the material is accomplished by means of relatively small flights. In the preferred form of the invention these flights consist of rods which are bent at various angles so as to readily move the material away from the inlet opening, and then to move the material more slowly as it nears the discharge end of the mixer. This action results in slightly compacting the entire product so that as it passes from the discharge spout and drops through the air, it passes down in a solid stream, almost like a stream of water, and there is no separation of the light chaff from the heavier coffee particles.

As an example, the usual prior coffee grinding mill, grinding coffee at the rate of 500 pounds per hour, and discharging into a barrel, displaces a lot of air as the material falls into the barrel. The velocity of the stream of material going into the barrel causes the lighter material to drop slowly into the displaced air coming out of the barrel, increasing the separation, and the sides of the barrel become coated with chaff and fine material. Under exactly the same conditions, when the improved mixer of this invention is employed on the outlet of the grinding mill, the material drops in a solid stream to the bottom of the barrel and the displaced air has no tendency to cause the light chaff, etc. to adhere to the sides of the barrel, and the resulting product is a homogeneous, non-stratifying mixture.

In one form of the invention the continuous mixer and compactor is used on a grinding mill having a special shaking mechanism for feeding the coffee or other material from a hopper to the grinding plates. The shaker-feeder, grinding plates and mixing apparatus operate in synchronism, the continuous vibration of the shaker-feeder preventing the coffee or other material from becoming packed and insuring a steady, uniform flow of material from the time it enters the machine until it is extruded as a homogeneous mass wherein the chaff is substantially invisible.

In the preferred form of the invention the combined grinding mill and mixer are water jacketed in a special manner which enables the machine to turn out a much cooler product than has heretofore been possible, and to begin this cooling at the point where the material first begins to be reduced. The lower the temperature at which coffee can be ground and mixed, the smaller will be the amount of carbon dioxide, aroma, etc., escaping from the coffee, these considerations affecting what is usually called the freshness of the coffee. By cooling the material from the time it enters the mill until it leaves the mixer it is possible to turn out a product having greatly improved keeping qualities.

These and other features and advantages of the invention will be described in connection with the accompanying drawings, in which:

Fig. 1 is a longitudinal section through a grinding mill embodying the invention;

Fig. 2 is a transverse section on the line 2—2 of Fig. 1 showing the water jacket adjacent one of the grinding plates;

Fig. 3 is a longitudinal section through the mixer, on a greatly enlarged scale;

Fig. 4 is a transverse section through the mixer taken on the line 4—4 of Fig. 3;

Fig. 5 is a transverse section through the rotatable mixing shaft taken on the line 5—5 of Fig. 3;

Fig. 6 is a detail section taken on the line 6—6 of Fig. 1;

Fig. 7 is a side view showing a modified mixer head with the discharge spout at the side;

Fig. 8 is a transverse sectional view of the head shown in Fig. 7;

Figs. 9, 10 and 11 are sectional end, side and top views, respectively, showing another form of mixer head with an adjustable discharge opening adjacent the bottom;

Figs. 12 and 13 are sectional end and side views, respectively, showing a mixer head having an adjustable discharge opening adjacent the top;

Figs. 14 and 15 are sectional end and side views, respectively, showing a modified mixer head with a special bearing for supporting the end of the mixer shaft inside the drum;

Fig. 16 is a plan view of the adjustable shutter plates used in Figs. 9 to 15 inclusive;

Fig. 17 is a fragmentary side view of a grinding and mixing mill having a shaker feeder;

Fig. 18 is a transverse section on the line 18—18 of Fig. 17; and

Fig. 19 is a fragmentary section on the line 19—19 of Fig. 17.

For purposes of illustration the invention is shown embodied in a grinding mill of the general type disclosed in Patent #1,489,695 to W. G. Burns and G. C. Herz, dated April 8, 1924.

The mill is supported on a pedestal 1 and comprises a feed hopper 2 and a rotatable shaft 3 carrying pulley 4 which may be driven by motor 5 through pulley 6 and belt 7. The driving belt and pulleys may be enclosed in a suitable housing 8. The motor 5 may be enclosed in a housing 9 and is preferably mounted on a platform 10 which is hinged at 12 to the base of the housing and may be raised or lowered by means of a threaded rod 13 to adjust the tension of the belt 7 as required.

The shaft 3 is mounted for rotation in a sleeve 14 which is supported in bearings 15 on the frame of the machine. This sleeve is keyed against rotation by screws 16 having headed portions which rest in longitudinal slots 17 in the sleeve and thus permit the sleeve to move to a limited extent in a longitudinal direction without rotating. The sleeve 14 is mounted on bearings on the shaft 3 and has internal shoulders 19 which engage the bearings to move the shaft in a longitudinal direction with the sleeve.

Below the feed hopper 2 is a feed screw 20 which is attached to the shaft 3 and moves the coffee beans or other material toward the grinding plates 21 and 22 contained within the housing 23. The grinding plate 21 is stationary and bolted or otherwise secured to the frame of the machine, while the rotatable grinding plate 22 is removably secured to a hub 24 on the shaft 3. The grinding plate 22 may be bolted to the hub 24 and the hub may be held on the shaft 3 by a set screw or other suitable means. It will be seen from the above that longitudinal movement of the sleeve 14 causes a corresponding movement of the shaft 3 which controls the spacing between the grinding elements 21 and 22 and therefore controls the grade of product, fine or coarse, as desired. The feed of coffee or other material to the feed screw may be regulated by a gate 24' at the mouth of the hopper 2.

The casing to which the stationary grinding plate 21 is attached is preferably provided with a cooling jacket 25 surrounding the bottom and sides of the feed screw 20. This jacket has an inlet 26 at the bottom and outlets 27 and 28 at the top of the respective branches on opposite sides of the screw conveyor. Cold water or other cooling fluid is admitted through the inlet 26 and the ascending heated fluid is withdrawn through the outlets 27 and 28. A cooling jacket 29 is also provided on the removable head of the housing 23 which surrounds the rotatable grinding plate 22. Water or other cooling fluid is admitted through an inlet 31 at the bottom of jacket 29 and the ascending heated fluid is withdrawn through an outlet 32 at the top of the jacket. This jacketing cools the coffee or other material from the time it enters the mill until it is reduced to the desired size by the grinding plates.

The position of sleeve 14 and shaft 3, and consequently the spacing between grinding elements 21 and 22, is controlled by a lever 33 which is pivoted at 34 to the frame of the machine. The upper end of lever 33 is seated between two depending lugs 35 on the under side of sleeve 14, while the lower end of this lever is seated in a block 36 which is threaded on an adjusting rod 37. The rod 37 extends through the walls of the hollow frame 1 and has a nut and washer 38 on one end and a thrust block 40 and washer 41 adjacent the other end.

A spring 42 is compressed between the block 40 and washer 41 and tends to move the rod 37 toward the left as viewed in Fig. 1. The lever 33 transmits this movement to the sleeve 14 in an opposite direction, so that the tendency of spring 42 is to move the sleeve 14 and shaft 3 toward the right in Fig. 1 and thus to move the rotatable grinding plate 22 toward the stationary grinding plate 21. This movement is opposed by a second spring 43 which tends to force the sleeve 14 toward the left in Fig. 1, and, though insufficient to overcome the spring 42, serves to cushion the movement of the sleeve 14. These springs also guard against mutilation of the grinding plates 21 and 22 by bits of iron or other hard foreign materials, allowing the grinding elements to separate until the obstruction has passed through.

The hand wheel 45 which controls the adjustment of the threaded rod 37 is of the type disclosed in the above-mentioned patent to Burns and Herz. This wheel is secured to the rod 37 in any suitable manner and has a plurality of teeth on its periphery. A latch 46 is pivoted on the frame 1 and is adapted to fit in between the teeth on the wheel 45 without any lost motion so as to lock the wheel 45 accurately in any adjusted position. A thumb screw 47 clamps a scale or index plate 48 against the hand wheel 45 to hold this plate in adjusted position. Letters or any other appropriate indicating symbols are placed on the index plate 48 for the purpose of designating the grade of coarse or fine product obtained when the latch or pointer 46 is beside a particular letter.

A second latch 49 of U-shaped cross-section is pivoted on the latch 46 with the sides of the U longer than the depth of the latch 46 so that when latch 46 goes over a tooth on the hand wheel 45, the second latch 49 will span the first latch and without any lost motion fit on opposite sides of the tooth over which the first latch is held. In this way an increased number of grades of product is obtainable, as regards the desired size of the coffee granules. In operation, the hand wheel 45 is turned until a desired mark, A, B, C, etc., is opposite the latch 46, rotation of threaded rod 37 moving the block 36 and causing lever 33 to move about its pivot in a direction to effect the desired adjustment of grinding plate 22 toward or away from grinding plate 21. The latch is then engaged in the proper tooth on the hand wheel, setting the mill to produce the desired grind.

The mixing, compacting and chaff reducing device comprises an elongated drum or tube 51 having an inlet pipe 52 arranged to be connected to the mill discharge chute 53 below the mill plates 21 and 22, a rear head 54 secured to the frame of the machine, and a detachable front head 55 fitting over the outer end of the drum 51 and clamped to the rear head by means of rods 56 which are tightened by wing nuts 57. The front head 55 is formed into a discharge spout 58 which opens downwardly and has an inside and elevated restricted discharge opening 59 communicating with the interior of the drum 51. In Figs. 3 and 4 the opening 59 is above the bottom of the drum 51 and is in the form of a semi-circle covering the upper half of the rear wall of the front head 55. The drum 51 is surrounded by a jacket 61 for the circulation of water or other cooling fluid which is admitted through an inlet 62 in the bottom and withdrawn through an outlet 63 at the top, the inlet being at one end of the drum and the outlet being at the opposite end.

The rotatable mixing shaft is preferably made in two sections 64 and 65 which are coupled together by a bayonet joint or similar connection 66 so that they may be readily separated and the mixing and compacting device removed as a unit when the clamping rods 56 are detached. The shaft sections 64 and 65 are journaled in the front and rear heads 55 and 54, respectively, and are driven from the main shaft 3 of the grinding mill through a belt 67 and a pulley 68 which is secured to the shaft section 65. It will thus be evident that the shaft 64 inside the drum 51 is rotated continuously during the operation of the grinding mill.

The mixing, agitating and conveying of the material within the drum 51 is accomplished by means of relatively small flights which, as shown in Figs. 3 and 4, preferably consist of rods 69 bent at various angles with their stems projecting through the shaft 64 and secured thereto by set screws 71. The outer ends of these rods are looped in the general form of a sickle so that they both mix and move the material without tossing it about and therefore prevent aeration. These small flights pass through the material and cause the portions engaged by the flights to rotate while the portions between the flights are interrupted in their free rotation by their weight or inertia and thus the particles of chaff are subjected to an abrading action by the rotating coffee granules against the chaff to reduce and commingle the chaff with the coffee particles into a product in which the chaff is substantially concealed without reducing the coffee granules which are preserved in granular form. The angular setting of the flights is such that they move the material away from the inlet pipe 52 at a fairly rapid rate, and then, as the material nears the discharge opening 59, the tendency of the flights is to move the material more slowly. The result of this action is to compact the material at the discharge end of the drum 51 so that the material emerges from the opening 59 and discharge spout 58 in a solid stream, almost like a stream of water, and there is no separation of the light chaff from the heavier coffee particles. This compressing or compacting effect is increased by the air produced by the grinding plates 21 and 22 and is further increased by the restriction of the opening 59.

In the construction shown in Figs. 3 and 4 the steady stream of mixed material emerging through the opening 59 will be broken by the shaft 64 which extends through the center of the spout 58, but this slight splitting or dividing of the stream will not separate the fine and coarse particles which were thoroughly mixed and compacted in the drum 51. If desired, however, the front head 55 may be replaced by a head 72 of the type shown in Figs. 7 and 8. This head has a restricted opening 73 on only one side of the shaft 64 so that the shaft will not divide the stream of material which flows from the drum 51 to the discharge spout 74.

Figs. 9 to 16 show various arrangements for adjusting the discharge outlet of the mixing and compacting device so that it may be increased or restricted in size to accommodate it to any desired capacity or output.

Figs. 9 to 11 show a front head 75 which is generally similar to that shown in Figs. 3 and 4, except that the rear wall of the head is replaced by a narrow annular flange 76 so as to leave a large opening between the drum 51 and the discharge spout 77. This opening is arranged to be closed by a pair of overlapping shutter plates 78 and 79 having concentric holes 81 which surround the shaft 64 and arcuate slots 82 which coincide progressively as the plates are rotated about the shaft 64. The plates 78 and 79 are secured to the upper edge of the flange 76 by means of a wing screw 83 which extends through the slots 82 and may be tightened to hold the plates in any adjusted position.

The plates 78 and 79 are each slightly larger than a semi-circle so that their lower edges will overlie each other and complete the circle when their overlapping upper edges are in the limiting position shown in Fig. 16 with the inner edges of the slots 82 engaging the screw 83. In this limiting position the drum 51 would be completely shut off from the discharge spout 77 except for the fact that a small gap would exist between the lower portion of the flange 76 and the plate 79 in the area marked x in Fig. 9. This gap would occur because the plate 79 stands out from the flange 76 for a distance equal to the thickness of the plate 78, and the material in the drum 51 would escape through this gap into the discharge spout 77 unless prevented. In the preferred form of the invention this gap is closed by a small arcuate shield 84 which is welded or otherwise secured to the lower edge of the plate 79 so that it closes the gap x when the plates 78 and 79 are in the closed position shown in Figs. 9 and 16.

It will be seen from the above that the shutter plates 78 and 79 may be adjusted as desired to vary the size of the opening between the drum 51 and the discharge spout 77 and thus vary the compactness and rate of discharge of the product. The proper adjustment can be found merely by looking at the discharged product. It is not wise to compact the product any more than necessary as it requires more power and tends to heat up the drum 51. Hence when the opening is restricted sufficiently, until there is no separation of the particles of chaff and coffee, there is no necessity for any further reduction in the size of the discharge opening. At the proper point, the coffee is ground by the mill, fed to the rear end of the mixer, moved away from the mill discharge by the flights, advanced through the mixer at a lower rate of speed as it nears the discharge or front end of the mixer, and then issues from the discharge spout in a fairly solid stream as it passes to the receptacles below.

Figs. 12 and 13 show a construction which is the same as Figs. 9 to 11 except that the shutter plates 78 and 79 are inverted so that the adjustable opening is adjacent the top of the head 75 between the drum 51 and discharge spout 77. The adjustment is effected in the same manner as described above.

Figs. 14 and 15 show a modified front head 85 having an integral rear wall 86 separating the drum 51 from the discharge spout 87 and provided with an arcuate opening 88 in its lower portion. This wall has a central bushing 89 which extends into the drum 51 and serves as a bearing for the end of the shaft 64. The adjustable shutter plates 78 and 79 are attached to the wall 86 in the same manner as shown in Figs. 9 to 13 and may be adjusted to vary the size of the opening 88 as previously described. It will be evident that the opening 88 may be at the top of the wall 86 instead of at the bottom, in which case the adjustable plates 78 and 79 will be inverted in the manner shown in Figs. 12 and 13. Since the shaft 64 does not extend into the discharge spout 87 it cannot break the stream of material issuing from the opening 88.

The mill shown in Figs. 17 to 19 is similar to that shown in Fig. 1 but is provided with a special shaking mechanism for feeding the coffee or other material from the hopper to the feed screw and grinding plates contained within the housing 23 of the mill. The hopper 91 is supported by rods 92 which are adjustably mounted in brackets 93 on the frame of the machine. Beneath the hopper is the shaker-feeder 94 having a spout 95 leading into the housing 23 directly above the feed screw which conveys the fed-in material to the grinding plates.

The shaker-feeder 94 is connected to the hopper 91 by a strip of leather or other flexible material 96 and is supported on the bottom by a vibratable bar 97 of steel or other suitable material. A lug 98 is welded or otherwise secured to an intermediate portion of the bar 97, and this lug is pivoted by a pin 99 to a bracket 101 which is adjustably mounted on the supporting rod 92 on one side of the machine. By adjusting the bracket 101 and bar 97 up or down the shaker-feeder 94 may be raised or lowered slightly as desired.

A bolt 102, secured to the bottom of the shaker-feeder 94, passes through the upper end of the bar 97 and this bolt is surrounded by a compression spring 103 which forces the bar 97 against the shaker-feeder while permitting it to vibrate freely. The lower end of the bar 97 contacts with a cam 104 which is mounted on the mixer shaft section 65 and has flat faces which cause the bar 97 to vibrate continuously. The continuous vibration of the shaker-feeder prevents the coffee or other material from becoming packed and insures a steady, uniform flow of material through the spout 95 in synchronism with the grinding and feeding operations.

The flow of material from the hopper 91 may be restricted or entirely shut off by a door 105 which is operated by a handle 106 and is adjusted in any desired position by means of a wing nut 107 and cooperating bolt which is secured to the side of the hopper and passes through a slot in the door.

It will be evident that the invention is capable of various other modifications and adaptations

The invention claimed is:

1. The combination with a coffee grinding mill having relatively movable grinding means for granulating the coffee and liberating the chaff and a discharge chute below said grinding means, of a mixing drum of substantially greater length than width having an inlet opening at one end connected to said discharge chute and a restricted discharge opening at the other end, and conveying and agitating devices in said drum for acting on the mixture of coffee and chaff to reduce the chaff and mix the coffee and chaff and moving it from the inlet end toward the discharge end, said conveying and agitating devices being arranged to move the material more rapidly toward the discharge end at the inlet end of the drum than at the discharge end so as to compact the material at the discharge end.

2. The combination with a coffee grinding mill having relatively movable grinding means for granulating the coffee and liberating the chaff and a discharge chute below said grinding means, of a mixing drum of substantially greater length than width having an inlet opening at one end adapted for connection to said discharge chute and a restricted discharge opening at the other end substantially smaller than the cross-sectional area of the drum, means for detachably connecting the drum to said mill and for coupling said inlet opening to said discharge chute, and conveying and agitating devices in said drum for acting on the mixture of coffee and chaff to reduce the chaff and mix the coffee and chaff and moving it from the inlet end toward the discharge end, said conveying and agitating devices being arranged to move the material more rapidly toward the discharge end at the inlet end of the drum than at the discharge end so as to compact the material at the discharge end.

3. A coffee grinding and mixing mill comprising a frame containing a housing, relatively movable grinding means in said housing for granulating the coffee and liberating the chaff, a discharge chute on said housing below said grinding means, a mixing drum of substantially greater length than width having an inlet opening adjacent one end for connection to said discharge chute, a rear head on said frame for closing the inlet end of said drum, a detachable front head for the other end of said drum having a restricted discharge opening substantially smaller than the cross-sectional area of the drum, means for clamping said drum between said front and rear heads, a rotatable shaft on said frame having a section journaled in said rear head and a separable section extending lengthwise through the drum and journaled in said front head, and a plurality of conveying and agitating devices on said separable shaft section for acting on the mixture of coffee and chaff to reduce the chaff and mix the coffee and chaff and moving it from the inlet end of the drum toward the discharge end, said conveying and agitating devices being arranged to move the material more rapidly toward the discharge end at the inlet end of the drum than at the discharge end so as to compact the material at the discharge end.

4. The combination with a coffee grinding mill comprising a frame, a housing on said frame, relatively movable grinding means in said housing for granulating the coffee and liberating the chaff, and an enclosed chute on said housing to discharge the mixture of coffee and chaff, of a mixing drum of substantially greater length than width having an inlet opening at one end for connection to said discharge chute, a rear head on said frame for closing the inlet end of the drum, a detachable front head for the discharge end of the drum having a restricted discharge opening substantially smaller than the cross-sectional area of the drum, rods for clamping said drum between said front and rear heads, a rotatable shaft on said frame having a section journaled in said rear head and a separable section extending lengthwise through the drum and journaled in said front head, a plurality of conveying and agitating flights on said separable shaft section projecting into the drum at various angles for acting on the mixture of coffee and chaff to reduce the chaff and mix the coffee and chaff and moving it from the inlet end toward the discharge end, the flights adjacent the inlet end of the drum being arranged to move the material more rapidly toward the discharge end than the flights adjacent the discharge end, and means for adjusting the setting of said flights to vary the compactness of the mixed material.

5. A method of treating roasted coffee beans, including the following steps: first granulating the coffee beans, and second working substantially all of the granulated coffee and any liberated chaff together for a period of time sufficient to pulverize the chaff and commingle it with the coffee.

6. The method of preparing a mixture of granulated coffee and chaff which comprises reducing the coffee beans and liberating the chaff, accumulating in a mass substantially all of said granulated coffee and chaff, and subjecting said mass to agitation for a sufficient period of time to pulverize the chaff and mix the same with the coffee.

7. In a device for granulating coffee beans and mixing granulated coffee and chaff, means for reducing coffee beans and liberating the chaff therein, an imperforate casing, inlet means at one end of said casing connecting with said reducing means for receiving the mixture of granulated coffee and liberated chaff, restricted discharge means at the other end of said casing, a rotatable shaft within said casing, conveying and agitating elements carried by said shaft for acting on the mixture of coffee and chaff to reduce the chaff and mix the coffee and chaff.

8. A coffee grinding mill of the character described, comprising in combination, a grinding means provided with a feeding inlet for material to be ground and a discharge therefrom, a conveyor chamber having an intake adjacent one end thereof, and a discharge adjacent the other end thereof, the discharge from the grinding means opening directly into the intake of said chamber, and a feeding means within the chamber including quick feed means adjacent the intake end of the chamber and slow feed means adjacent the discharge of the chamber, said means comprising members rigidly mounted on a common drive shaft and including elements extending radially to a point adjacent the inner surface of the chamber and having surfaces extending longitudinally of the chamber and inclined with respect to the axis thereof, the inclination or pitch of the elements being such that those adjacent the intake end feed the material at a more rapid rate than those adjacent the discharge end, both of said feed means feeding toward the discharge end of the chamber and arranged to cooperate with each other and the chamber wall to accumulate and compact the ground bean and chaff.

9. The method of preparing a mixture of granulated coffee and chaff which comprises granulating the coffee to liberate the chaff and to produce coffee granules of desired size, and then working the coffee granules thus produced against the liberated chaff for a period of time sufficient to reduce the chaff and make the chaff substantially invisible in the finished product while preserving the granular form of the coffee.

10. The method of preparing a mixture of granulated coffee and chaff which comprises granulating the coffee to liberate the chaff and to produce coffee granules of desired size, accumulating a mass of the coffee granules and chaff, and then working the coffee granules in the mass against the commingled chaff for a period of time sufficient to reduce the chaff and mix the coffee and chaff and produce a homogeneous product wherein the chaff is substantially invisible while preserving the granular form of the coffee.

11. The process of preparing coffee that has been broken up into coffee particles of relatively uniform size as well as into particles of chaff which includes the steps of propelling the coffee mass thus formed in a continuous stream along a given path of substantial length longitudinally to an axis and contemporaneously rotating the mass about said axis and subjecting it to agitation to cause relative movement between the coffee particles and liberated chaff for a period of time sufficient to subject the particles of chaff to such an abrading action by the rotating coffee particles as to reduce and commingle the chaff with the coffee particles into a product in which the chaff is substantially concealed.

ARCHIBALD D. KIRKLAND.